US012541777B2

(12) United States Patent
Malon et al.

(10) Patent No.: US 12,541,777 B2
(45) Date of Patent: Feb. 3, 2026

(54) COUNTING AND EXTRACTING OPINIONS IN PRODUCT REVIEWS

(71) Applicant: NEC Laboratories America, Inc., Princeton, NJ (US)

(72) Inventors: Christopher Malon, Fort Lee, NJ (US); Hideo Kobayashi, Dallas, TX (US)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 18/360,307

(22) Filed: Jul. 27, 2023

(65) Prior Publication Data
US 2024/0062256 A1    Feb. 22, 2024

Related U.S. Application Data

(60) Provisional application No. 63/398,640, filed on Aug. 17, 2022.

(51) Int. Cl.
*G06Q 30/0282*    (2023.01)
*G06F 40/295*    (2020.01)
*G06F 40/30*    (2020.01)

(52) U.S. Cl.
CPC ....... *G06Q 30/0282* (2013.01); *G06F 40/295* (2020.01); *G06F 40/30* (2020.01)

(58) Field of Classification Search
CPC .... G06Q 30/0282; G06F 40/295; G06F 40/30
See application file for complete search history.

(56) References Cited

U.S. PATENT DOCUMENTS

| | | | | |
|---|---|---|---|---|
| 2005/0091038 | A1* | 4/2005 | Yi | G06F 16/345 707/E17.094 |
| 2011/0113027 | A1* | 5/2011 | Shen | G06Q 30/0282 707/723 |
| 2015/0379090 | A1* | 12/2015 | Gou | G06F 16/335 707/754 |
| 2016/0180437 | A1* | 6/2016 | Boston | G06Q 30/0631 705/26.7 |
| 2016/0180438 | A1* | 6/2016 | Boston | G06Q 30/0282 705/26.7 |

(Continued)

OTHER PUBLICATIONS

Aravindan, S. and A. Ekbal, "Feature Extraction and Opinion Mining in Online Product Reviews," 2014, International Conference on Information Technology, Bhubaneswar, India, pp. 94-99, (Year: 2014).*

(Continued)

*Primary Examiner* — Jeff Zimmerman
*Assistant Examiner* — Wayne S. Murray
(74) *Attorney, Agent, or Firm* — Vincent Duffy; Joseph Kolodka

(57) ABSTRACT

A computer-implemented method for counting and extracting opinions in product reviews is provided. The method includes inputting a hypothesis opinion, a product name, and product reviews relating to a product, applying a decontextualization component to the product reviews by using the product name, applying the decontextualization component to the hypothesis opinion by using the product name, applying an entailment model to classify each sentence of the decontextualized product reviews against the decontextualized hypothesis opinion, and outputting one or more sentences classified as entailing the hypothesis opinion and a count of corresponding reviews.

17 Claims, 5 Drawing Sheets

(56) References Cited

U.S. PATENT DOCUMENTS

| | | | |
|---|---|---|---|
| 2018/0260860 A1* | 9/2018 | Devanathan | G06F 16/353 |
| 2023/0214888 A1* | 7/2023 | Renard | G06Q 30/016 |
| | | | 705/7.29 |

OTHER PUBLICATIONS

Laban, P., Schnabel, T., Bennett, P. N., & Hearst, M. A. (Feb. 9, 2022). SummaC: Re-visiting NLI-based models for inconsistency detection in summarization. Transactions of the Association for Computational Linguistics, 10, 163-177.

Pontiki, M., Galanis, D., Papageorgiou, H., Androutsopoulos, I., Manandhar, S., AL-Smadi, M., . . . & Eryiit, G. (Jun. 16, 2016). Semeval-2016 task 5: Aspect based sentiment analysis. In ProWorkshop on Semantic Evaluation (SemEval-2016) (pp. 19-30). Association for Computational Linguistics.

Pontiki, M., Galanis, D., Pavlopoulos, J., Papageorgious, H., Androutsopoulos, I., Manandhar, S. (Aug. 23, 2014) Semeval-2014 Task 4: Aspect based sentiment analysis. In Proceedings of the 8th International Workshop on Semantic Evaluation. (pp. 27-35).

Aone, C., & William, S. (Jun. 1, 1995). Evaluating automated and manual acquisition of anaphora resolution strategies. In 33rd Annual Meeting of the Association for Computational Linguistics (pp. 122-129).

Williams, A., Nangia, N., & Bowman, S. R. (Apr. 18, 2017). A broad-coverage challenge corpus for sentence understanding through inference. arXiv preprint arXiv:1704.05426.

Recasens, M., De Marneffe, M. C., & Potts, C. (Jun. 9, 2013). The life and death of discourse entities: Identifying singleton mentions. In Proceedings of the 2013 conference of the North American chapter of the association for computational linguistics: human language technologies (pp. 627-633).

Lee, H., Chang, A., Peirsman, Y., Chambers, N., Surdeanu, M., & Jurafsky, D. (Nov. 20, 2012). Deterministic coreference resolution based on entity-centric, precision-ranked rules. Computational linguistics, 39(4), 885-916.

Hou, Y., Markert, K., & Strube, M. (Oct. 25, 2014). A rule-based system for unrestricted bridging resolution: Recognizing bridging anaphora and finding links to antecedents. In Proceedings of the 2014 Conference on Empirical Methods in Natural Language Processing (EMNLP) (pp. 2082-2093).

Clark, H. H. (1975). Bridging. In Theoretical issues in natural language processing. Stanford University Journal. (pp. 1-6).

Chu, E., & Liu, P. (May 24, 2019). Meansum: A neural model for unsupervised multi-document abstractive summarization. In International Conference on Machine Learning (pp. 1223-1232). PMLR.

Kim Amplayo, R., Brazinskas, A., Suhara, Y., Wang, X., & Liu, B. (Jul. 6, 2022). Beyond opinion mining: Summarizing opinions of customer reviews. In Proceedings of the 45th International ACM SIGIR Conference on Research and Development in Information Retrieval (pp. 3447-3450).

Wan, D., & Bansal, M. (May 16, 2022). FactPEGASUS: Factuality-aware pre-training and fine-tuning for abstractive summarization. arXiv preprint arXiv:2205.07830.

Schuster, T., Fisch, A., & Barzilay, R. (Jun. 6, 2021). Get your vitamin C! robust fact verification with contrastive evidence. arXiv preprint arXiv:2103.08541.

Scialom, T., Dray, P. A., Gallinari, P., Lamprier, S., Piwowarski, B., Staiano, J., & Wang, A. (Nov. 7, 2021). Questeval: Summarization asks for fact-based evaluation. arXiv preprint arXiv:2103.12693.

Cao, M., Dong, Y., Wu, J., & Cheung, J. C. K. (Nov. 16, 2020). Factual error correction for abstractive summarization models. arXiv preprint arXiv:2010.08712.

De Clercq, O., & Hoste, V. (Dec. 12, 2020). It's absolutely divine! Can fine-grained sentiment analysis benefit from coreference resolution ?. In CRAC workshop (pp. 11-21). Association for Computational Linguistics (ACL).

Suhara, Y., Wang, X., Angelidis, S., & Tan, W. C. (Jul. 5, 2020). OpinionDigest: A simple framework for opinion summarization. arXiv preprint arXiv:2005.01901.

Angelidis, S., Amplayo, R. K., Suhara, Y., Wang, X., & Lapata, M. (Dec. 8, 2020). Extractive opinion summarization in quantized transformer spaces. Transactions of the Association for Computational Linguistics, 9, 277-293.

Xu, L., & Choi, J. D. (Sep. 28, 2020). Revealing the myth of higher-order inference in coreference resolution. arXiv preprint arXiv:2009.12013.

Wang, H., Liu, B., Li, C., Yang, Y., & Li, T. (Aug. 31, 2019). Learning with noisy labels for sentence-level sentiment classification. arXiv preprint arXiv:1909.00124.

Joshi, M., Chen, D., Liu, Y., Weld, D. S., Zettlemoyer, L., & Levy, O. (Jan. 18, 2020). Spanbert: Improving pre-training by representing and predicting spans. Transactions of the association for computational linguistics, 8, 64-77.

Loshchilov, I., & Hutter, F. (Jan. 4, 2019). Decoupled weight decay regularization. arXiv preprint arXiv:1711.05101.

Lee, K., He, L., Lewis, M., & Zettlemoyer, L. (Dec. 15, 2017). End-to-end neural coreference resolution. arXiv preprint arXiv:1707.07045.

He, R., & McAuley, J. (Feb. 6, 2016). Ups and downs: Modeling the visual evolution of fashion trends with one-class collaborative filtering. In proceedings of the 25th international conference on world wide web (pp. 507-517).

Mcauley, J., Targett, C., Shi, Q., & Van Den Hengel, A. (Jun. 17, 2015). Image-based recommendations on styles and substitutes. In Proceedings of the 38th international ACM SIGIR conference on research and development in information retrieval (pp. 43-52).

Bahdanau, D., Cho, K., & Bengio, Y. (May 19, 2016). Neural machine translation by jointly learning to align and translate. arXiv preprint arXiv:1409.0473.

\* cited by examiner

COUNTING AND EXTRACTING OPINIONS IN PRODUCT REVIEWS

RELATED APPLICATION INFORMATION

This application claims priority to Provisional Application No. 63/398,640 filed on Aug. 17, 2022, the contents of which are incorporated herein by reference in their entirety.

BACKGROUND

Technical Field

The present invention relates to product reviews, and, more particularly, to counting and extracting opinions in product reviews.

Description of the Related Art

Product reviews may have complex discourse including coreference and bridging relations to a main product, competing products, and interacting products. Current approaches to aspect-based sentiment analysis (ABSA) and opinion summarization largely ignore this complexity.

SUMMARY

A method for counting and extracting opinions in product reviews is presented. The method includes inputting a hypothesis opinion, a product name, and product reviews relating to a product, applying a decontextualization component to the product reviews by using the product name, applying the decontextualization component to the hypothesis opinion by using the product name, applying an entailment model to classify each sentence of the decontextualized product reviews against the decontextualized hypothesis opinion, and outputting one or more sentences classified as entailing the hypothesis opinion and a count of corresponding reviews.

A non-transitory computer-readable storage medium comprising a computer-readable program for counting and extracting opinions in product reviews is presented. The computer-readable program when executed on a computer causes the computer to perform the steps of inputting a hypothesis opinion, a product name, and product reviews relating to a product, applying a decontextualization component to the product reviews by using the product name, applying the decontextualization component to the hypothesis opinion by using the product name, applying an entailment model to classify each sentence of the decontextualized product reviews against the decontextualized hypothesis opinion, and outputting one or more sentences classified as entailing the hypothesis opinion and a count of corresponding reviews.

A system for counting and extracting opinions in product reviews is presented. The system includes a processor and a memory that stores a computer program, which, when executed by the processor, causes the processor to input a hypothesis opinion, a product name, and product reviews relating to a product, apply a decontextualization component to the product reviews by using the product name, apply the decontextualization component to the hypothesis opinion by using the product name, apply an entailment model to classify each sentence of the decontextualized product reviews against the decontextualized hypothesis opinion, and output one or more sentences classified as entailing the hypothesis opinion and a count of corresponding reviews.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
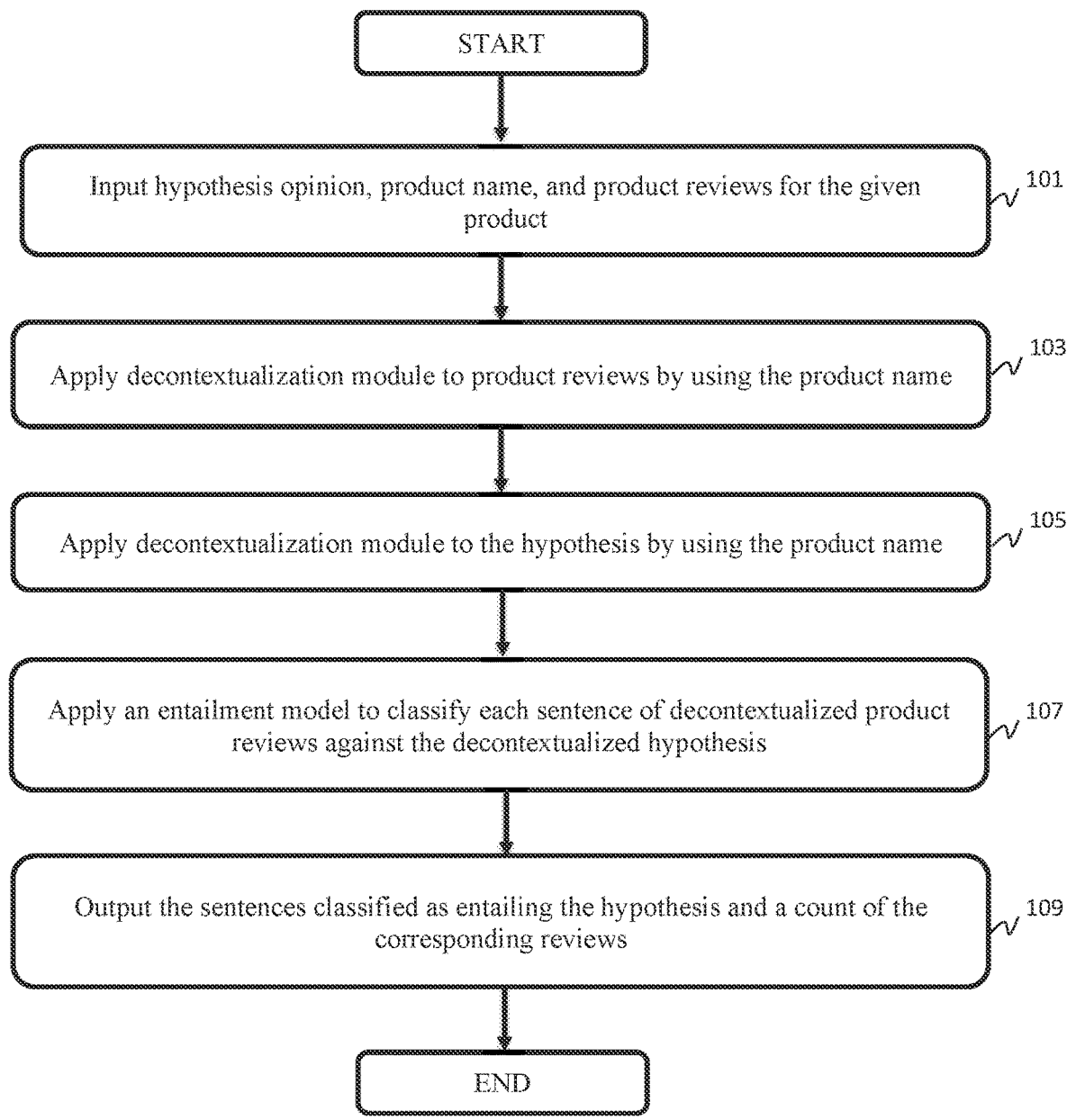
FIG. 1 is a block/flow diagram of an exemplary method to count and extract opinions and product reviews by decontextualization, in accordance with embodiments of the present invention.

To help consumers and businesses make sense of high volumes of product reviews, the natural language processing (NLP) community has developed techniques for aspect-based sentiment analysis (ABSA), and, more recently, opinion summarization. These techniques have developed mostly without addressing challenges in coreference or bridging.

In aspect-based sentiment analysis, aspect categories and associated polarities are extracted. In one subtask, this is done on a per sentence basis without awareness of the product being reviewed. In the other, the full review is available, but entity comparisons are not explicitly performed. These approaches pose a danger when a customer mentions a competing product or interacting product in the review, because aspects pertaining to the competing product may be falsely associated with the main product.

As a multi-document summarization task with extractive and abstractive approaches, opinion summarization may create coreference errors by quoting a pronoun out of context (extractive) or generating a sentence with entities confused (abstractive). Factuality checking promises more correct summaries, either by postprocessing outputs judged to be logically inconsistent, or by providing a training signal for contrastive learning. However, a state-of-the-art natural language inference (NLI)-based factuality score often fails to capture coreference errors.

Because existing ABSA and factuality scores do not learn to catch coreference or bridging errors adequately, a new resource is necessary. Prior works released coreference annotations on restaurant reviews, but this domain mostly lacked the mentions of competitors and interacting products found in product reviews.

The exemplary embodiments define a mention classification task for product reviews which simplifies the coreference and bridging resolution tasks. The simplified task reduces labeling burden compared to labeling all pairs of mentions. Minimally trained crowd workers can assign labels with good agreement.

The contributions made by the exemplary embodiments are simplifying coreference and bridging for product reviews into a task for which quality labels can be obtained from crowd workers, constructing a dataset for this task, showing the weakness of a state-of-the-art factuality score on detecting confused entity mentions in product reviews, and preliminary analysis of an existing coreference system applied to the annotated data. Once enough data for training is collected, it is envisioned that ABSA or NLI systems may use predicted mention types as features, so that, e.g., an ABSA system would recognize a sentence discussing an attribute of a competing product and not report it as an aspect of the product being reviewed, or a factuality score would catch entity inconsistency between source and generated text.

The exemplary methods annotated 498 electronics reviews from the Amazon Review Dataset including reviews posted from May 1996 to July 2014. The exemplary methods used the electronics category as the reviews in this category are expected to include competing products and interacting items frequently. The rating for each review is given, and the product name was retrieved from the Rainforest application programming interface (API).

Regarding the annotation scheme, rather than asking workers to annotate mention pairs, the exemplary methods identify the main product by the name of the product being reviewed and ask the workers to annotate every mention in the review by whether it is identical to the main product, a competing product, a product interacting with the main product or competitors, or a generic term for the category of the main product. Four corresponding bridging-related mention types are annotated for mentions that refer to a part or attribute of one of these categories. Every other mention is annotated with the ninth type, that is, "others."

In this way, a mention type specifies less information than a true coreference or bridging relation. It is expected that the antecedent of every coreference relation to be labeled with the same mention type, and the antecedent of every bridging relation to be labeled with a corresponding mention type. While the "main product" type usually includes a single coreference cluster, multiple, non-identical competing products or interacting products may be mentioned.

For each of the 498 reviews, the exemplary methods produce mentions and crowd workers annotate mention types. The exemplary methods use the mention detection sieve in the Stanford's Multi-Pass Sieve Coreference Resolution System to extract mentions, including singletons. The exemplary methods filter out personal mentions because the annotation scheme is not concerned with them.

Regarding the annotation procedure and agreement reviews with mixed sentiments, to collect competing, generic, and interacting mentions more efficiently, the exemplary methods filter the source reviews as follows. A review with 2 to 4 stars overall could have mixed sentiments because it talks about both pros and cons of the main product, but it is expected that 1 or 5 star reviews with mixed sentiments say only negative (or positive) things about the main product so that positive (or negative) sentiments must refer to a competing, generic, or interacting product. Thus, the exemplary methods take the mixed-sentiment reviews with 1 or 5 stars to obtain source data likely to include more competing, generic, or interacting products.

Hence, the exemplary methods train a sentence-level sentiment analysis classifier to find reviews including sentences with mixed sentiments. The exemplary methods employ, e.g., RoBERTa-base and pre-train the model on a noisy-labeled training datasets, which includes electronics reviews from the Amazon review dataset. The exemplary methods use 4 or 5 stars as positive and 1 or 2 stars as negative instances. These are noisy data because positive (or negative) instances could include negative (or positive) sentences. Then, the exemplary methods fine-tune the model on a clean sentence-level sentiment dataset.

Regarding crowd sourcing talk, the exemplary methods collect annotations via crowdsourcing on Amazon Mechanical Turk (AMT). Workers are given a review that includes 15 to 20 mentions, where a sentence, "I bought {product name}," is added at the beginning of the review to help the annotator understand the review text. Then, the exemplary methods ask three workers to select a mention type for each mention in a review. Workers are required to pass a qualification test and are soft blocked if their agreement with majority labels is worse than 85%. The exemplary methods focus on agreed mentions, meaning those on which a majority (2 of 3) of workers agreed on a label.

Table 1, reproduced below, shows test dataset statistics. In total, eleven crowd workers annotated 8,894 mentions in 498 reviews. An additional dataset of 1,506 reviews was collected and annotated in the same way for training.

TABLE 1

Statistics on dataset

| Docs | Sentences | Tokens | Mentions |
| --- | --- | --- | --- |
| 498 | 3,883 | 63,184 | 8,894 |

The resulting distribution of labels is shown in Table 2, reproduced below. As can be seen, bridging labels are less frequent than their non-bridging counterparts. For both kinds, the interacting is the second most frequent and the competing is the third most frequent label.

TABLE 2

Distribution of mention types for agreed mentions

| Mention Type | Counts |
| --- | --- |
| Main | 2864 |
| P/A of Main | 1512 |
| Competing | 429 |
| P/A of Competing | 103 |
| Generic | 193 |
| P/A of Generic | 18 |
| Interacting | 853 |
| P/A of Interacting | 308 |
| Others | 2127 |

The exemplary methods use, e.g., Cohen's kappa to measure inter-annotator agreement. For each mention, the exemplary methods order three annotators in the order of submission time and use all pairs of three annotators for calculating agreement. Over all pairs, the agreement between the earlier annotator and the later annotator is substantial: kappa is 0.6814.

FIG. 1 is a block/flow diagram of an exemplary method to count and extract opinions and product reviews by decontextualization, in accordance with embodiments of the present invention.

At block 101, input the hypothesis opinion, product name, and product reviews for the given product.

At block 103, apply a decontextualization module to the product reviews by using the product name.

At block 105, apply the decontextualization module to the hypothesis by using the product name.

At block 107, apply an entailment model to classify each sentence of the decontextualized product reviews against the decontextualized hypothesis.

At block 109, output the sentences classified as entailing the hypothesis and a count of the corresponding reviews.

Figure 2:
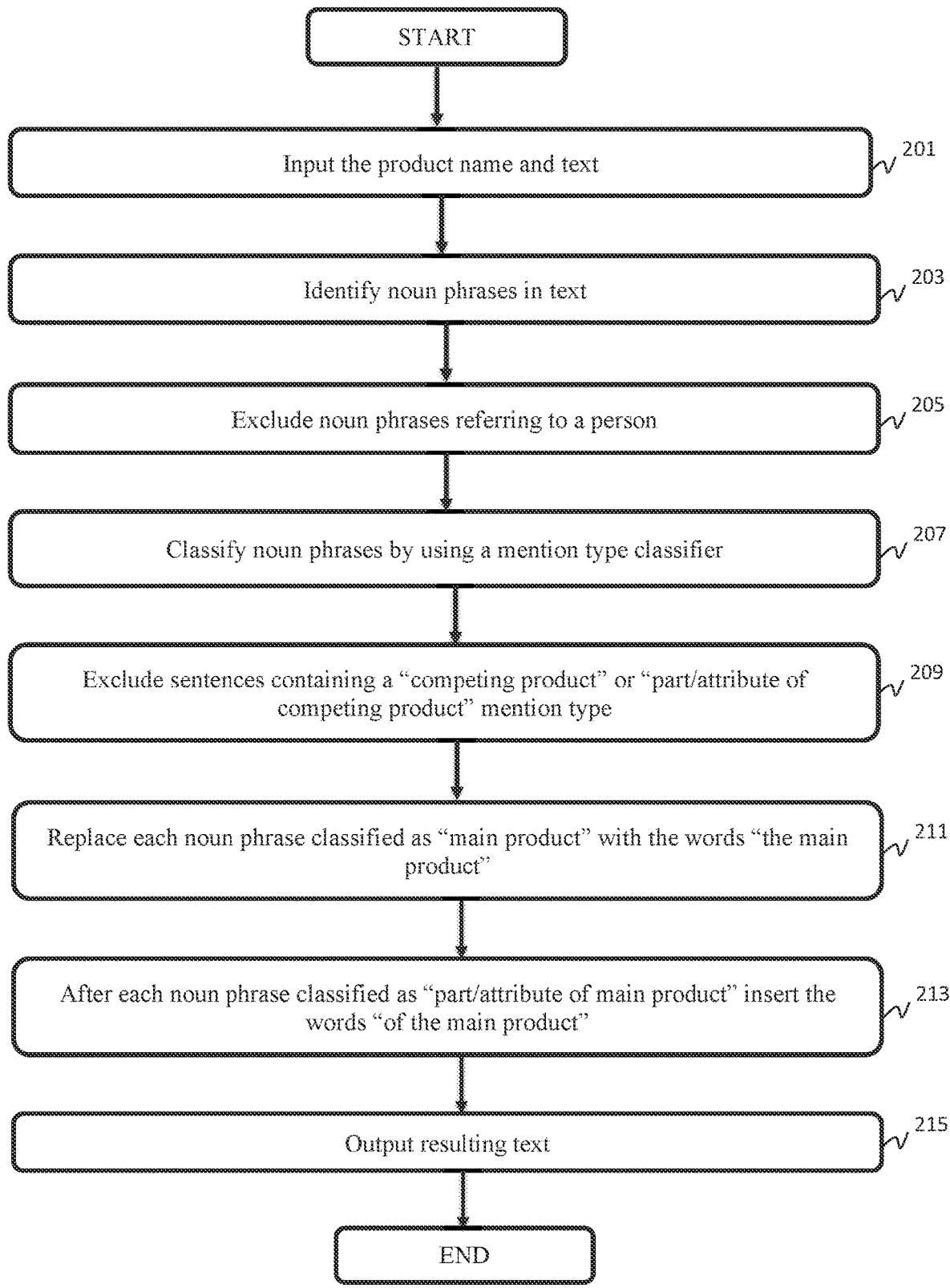
FIG. 2 is a block/flow diagram of an exemplary method to use a decontextualization module, in accordance with embodiments of the present invention.

FIG. 2 is a block/flow diagram of an exemplary method to use a decontextualization module, in accordance with embodiments of the present invention.

At block 201, input the product name and text.

At block 203, identify noun phrases in text. The exemplary methods use the mention detection sieve in the Stanford's Multi-Pass Sieve Coreference Resolution System to extract mentions, including singletons, as noun phrases.

At block 205, exclude noun phrases referring to a person. An exemplary method uses a list of personal pronouns to identify such phrases.

At block 207, classify noun phrases by using a mention type classifier.

At block 209, exclude sentences containing a "competing product" or "part/attribute of competing product" mention type.

At block 211, replace each noun phrase classified as "main product" with the words "the main product."

At block 213, after each noun phrase classified as "part/attribute of main product" insert the words "of the main product."

At block 215, output the resulting text.

Figure 3:
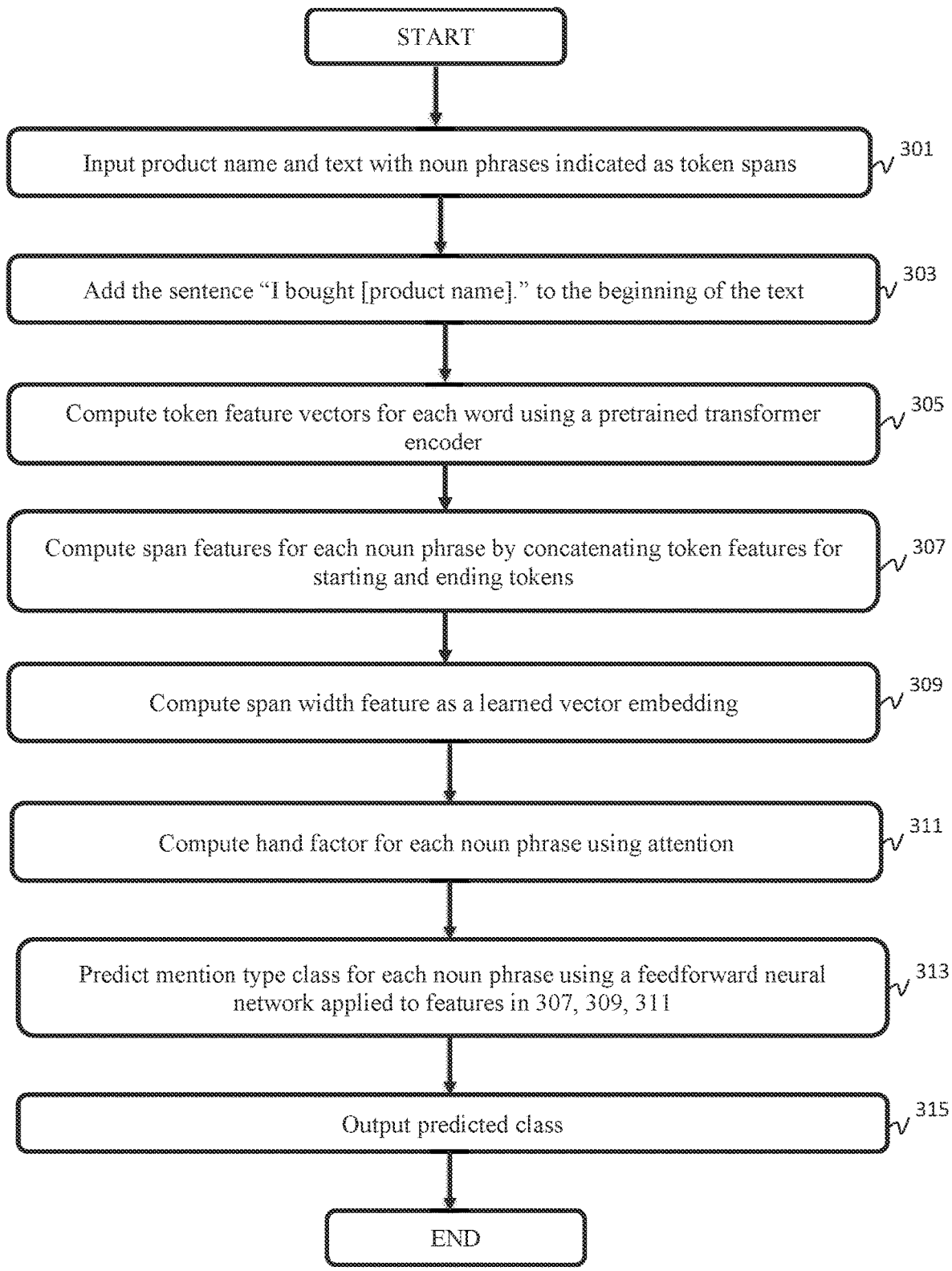
FIG. 3 is a block/flow diagram of an exemplary method to use a mention type classifier, in accordance with embodiments of the present invention.

FIG. 3 is a block/flow diagram of an exemplary method to use a mention type classifier, in accordance with embodiments of the present invention.

At block 301, input the product name and text with noun phrases indicated as token spans.

At block 303, add the sentence "I bought [product name]." to the beginning of the text.

At block 305, compute token feature vectors for each word using a pretrained transformer encoder.

At block 307, compute span features for each noun phrase by concatenating token features for starting and ending tokens.

At block 309, compute a span width feature as a learned vector embedding.

At block 311, compute a head vector for each noun phrase using attention over words within the noun phrase At block 313, predict mention type class for each noun phrase using a feedforward neural network applied to features in blocks 307, 309, 311.

At block 315, output the predicted class.

Mention type classes must include "main product," "part/attribute of main product," "competing product," "part/attribute of competing product," and "others," and may also include other classes such as "interacting product," "part/attribute of interacting product," "generic item," and "part/attribute of generic item."

Examples of mention types can include:

Regarding the main product, the main product is a phrase that refers to the product being reviewed. For example:

I bought a Canon EOS 90D camera. I love this product so much. It has amazing lenses.

Regarding the competing product, the competing product is a phrase that refers to something a reviewer might purchase (or already did purchase) as an alternative to the main product. For example:

I bought Sennheiser Headphone. The sound quality is poor. My Phillips headphones have better sound quality.

I bought Anker speaker. After going through reviews of the different products, I decided to go with this little monster.

Regarding the generic term, the generic term is a phrase that refers to a general class of products to which the main product belongs. For example:

I bought Sony speaker. So, I was thinking about getting a small portable Bluetooth speaker for some time.

Regarding the Part-of/Attribute-of Main Product, this indicates a phrase that is a part or attribute of the product being reviewed. For example:

I bought Sennheiser Headphone. But, the cable easily get tangled.

I bought Apple iPhone 13 Silicone Case. I like its color.

Regarding Part-of/Attribute-of Competing Product, this indicates a phrase that is a part or attribute of the competing product. For example:

I bought a Surface Laptop. I like my old MacBook because its keyboard is easy to type.

Regarding Part-of/Attribute-of Generic Term, this indicates a phrase that is a part or attribute of the general class to which the main product belongs, not specifically the main product. For example:

I bought a Surface Laptop 11-inch. I've been thinking to buy a 11-inch laptop, but I was worried if the screen is too small. Turned out it's good enough.

Regarding an interacting item, the interacting item is a phrase that refers to an item that are used with the main product, competing product, or generic term. For example:

I bought Samsung monitor. I used my HDMI cable to connect with a laptop, but the cable was broken.

Regarding Part-of/Attribute-of Interacting Item, this indicates a phrase that is a part or attribute of the interacting item. For example:

I bought Samsung monitor. I used my laptop with this monitor, but it did not work. I typed on the keyboard of the laptop.

Regarding "others," this indicates a phrase that is not any of above types.

To investigate which parts of the annotation scheme are well-defined and well understood, Table 3, reproduced below, shows the confusion matrix for annotations on agreed mentions, where rows correspond to workers' annotations and columns correspond to the majority label. Many generic mentions are thought to refer to the main product, and a part or attribute of a generic mention may be confused with a particular (main or competing) product.

TABLE 3

Confusion matrix on agreed mentions

|  | Main | P/A of Main | Com | P/A of Com | Gen | P/A of Gen | Int | P/A of Int | Oth |
|---|---|---|---|---|---|---|---|---|---|
| Main | 95.05 | 1.68 | 1.71 | 0.65 | 5.35 | 0 | 0.78 | 0.11 | 0.96 |
| P/A of Main | 2.09 | 89.2 | 0.62 | 4.85 | 1.55 | 5.56 | 1.37 | 5.09 | 3.98 |
| Com | 0.54 | 0.13 | 90.6 | 1.29 | 4.84 | 3.7 | 0.55 | 0.22 | 0.25 |
| P/A of Com | 0.04 | 0.4 | 1.48 | 83.82 | 0.52 | 3.7 | 0.16 | 0.87 | 0.41 |

TABLE 3-continued

Confusion matrix on agreed mentions

|          | Main | P/A of Main | Com  | P/A of Com | Gen   | P/A of Gen | Int   | P/A of Int | Oth   |
|----------|------|-------------|------|------------|-------|------------|-------|------------|-------|
| Gen      | 0.62 | 0.35        | 2.87 | 0.97       | 84.11 | 3.7        | 0.86  | 0.87       | 0.24  |
| P/A of Gen | 0.03 | 0.26      | 0.08 | 2.27       | 1.21  | 81.48      | 0.04  | 0.43       | 0.16  |
| Int      | 0.45 | 0.99        | 0.7  | 0.32       | 0.86  | 0          | 91.01 | 7.58       | 1.22  |
| P/A of Int | 0.11 | 1.54      | 0.16 | 1.94       | 0.35  | 0          | 3.09  | 80.52      | 1.22  |
| Oth      | 1.07 | 5.45        | 1.79 | 3.88       | 1.21  | 1.85       | 2.15  | 4.33       | 91.57 |

An opinion counting system takes as input a hypothesis opinion, a product name, and a set of reviews for that product. It runs a trained entailment (NLI) classifier (such as a model trained on MNLI). It extracts sentences from reviews that the classifier predicts as entailing the hypothesis and counts the corresponding number of reviews.

Such a system may be improved by decontextualizing the reviews using a mention type classifier, such as the one described above. After inserting "I bought [product name]" to the beginning of each product review and the hypothesis opinion, each mention (non-personal noun phrase) may be classified as one of nine types.

Prior to running the entailment (NLI) classifier on the sentences of the review and the hypothesis, the hypothesis and each sentence are rewritten as follows. Sentences that include a noun phrase classified as "competing product" or "part/attribute of competing product" are excluded and not input to the NLI classifier. Noun phrases classified as "main product" are substituted with the text, "the main product." Noun phrases classified as "part/attribute of main product" have the text, "of the main product," inserted afterwards. Then the NLI classifier is run, and sentences that entail the hypothesis are extracted, and the corresponding reviews are counted.

In this way, confusion between the main product and competing products and their attributes can be reduced, and various ways of referring to the main product can be unified in a way that avoids confusion with other noun phrases.

Figure 4:
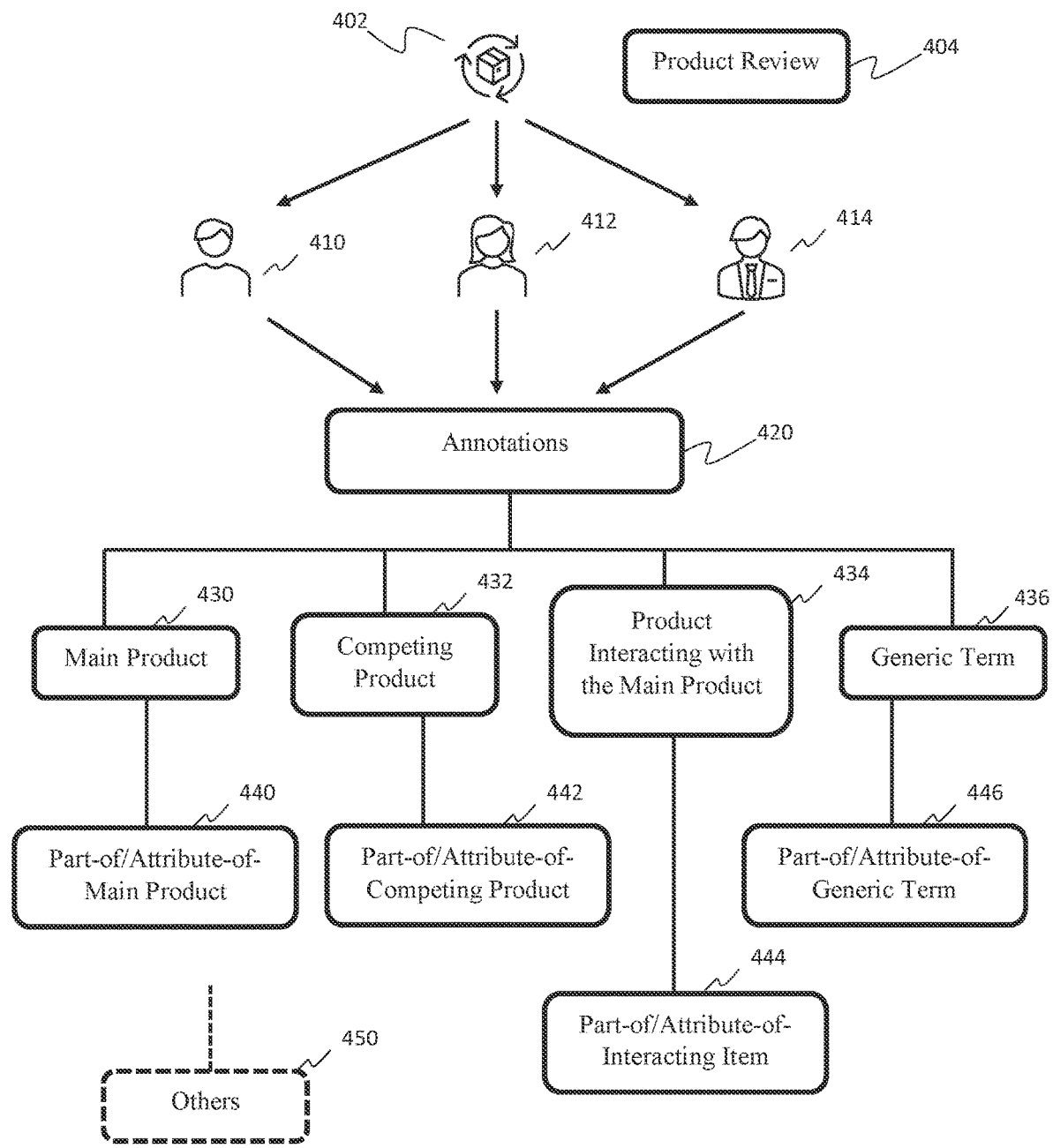
FIG. 4 is a block/flow diagram of an exemplary annotation scheme where workers identify mentions, in accordance with embodiments of the present invention.

FIG. 4 is a block/flow diagram of an exemplary annotation scheme where workers identify mentions, in accordance with embodiments of the present invention. Results of this annotation scheme may be used to train the mention type classifier shown in FIG. 3. The mention type classifier can be trained by using, e.g., the AdamW optimizer. For instance, the model can be fine-tuned for 4 epochs with a dropout rate of 0.3 and learning rates of 1×10-5 for SpanBERT parameters and 3×10-4 for task parameters. The model with the best performance on the development set is used. Using the same annotation scheme, additional data beyond the 498 reviews already described were collected to train the mention type classifier.

A product 402 is being reviewed (product reviews 404) by, e.g., a first worker 410, a second worker 412, and a third worker 414. The first, second, and third workers 410, 412, 414 provide annotations 420 to the product reviews 404.

The exemplary methods identify the main product 430 by the name of the product being reviewed and ask the workers 410, 412, 414 to annotate (420) every mention in the review by whether it is identical to the main product 430, a competing product 432, a product interacting with the main product 434 or competitors, or a generic term 436 for the category of the main product. Four corresponding bridging-related mention types are annotated for mentions that refer to a part or attribute of one of these categories. That is, a part-of attribute main product 440, a part-of/attribute of competing product 442, a part-of/attribute of interacting item 444, and a part-of/attribute of generic term 446. Every other mention is annotated with the ninth type, others 450.

In conclusion, the exemplary embodiments introduce a new corpus of electronics product reviews with a relaxed form of coreference and bridging annotation. The exemplary embodiments were tested on a OntoNotes-based coreference system on the reviews and used the annotations to measure how much a factuality score failed to detect coreference errors on product reviews. It was outlined how the data resource may be used to avoid entity reference errors when counting opinions in product reviews.

Moreover, the noun phrases in each sentence of each product review and the hypothesis opinion are classified by their relation to the main product being reviewed. Using this classification, sentences are filtered or rewritten to make the relation of noun phrases to the main product clearer in isolation, without the need of contextual information from surrounding sentences. Each sentence of the rewritten product reviews is compared to the rewritten hypothesis opinion using a trained entailment model. The sentences that are classified as entailing the hypothesis opinion are counted and can be extracted for display.

By introducing noun phrase classification before entailment classification, mistakes that associate aspects of competing products with opinions about the main product can be avoided. A set of noun phrase classes describing relations to the main product provides enough information for decontextualization without requiring learning of full coreference and bridging relations. With a couple thousand reviews, a classifier can learn to distinguish the main product from these other classes well enough to outperform a coreference resolution system that has not been adapted to the product review domain.

Figure 5:
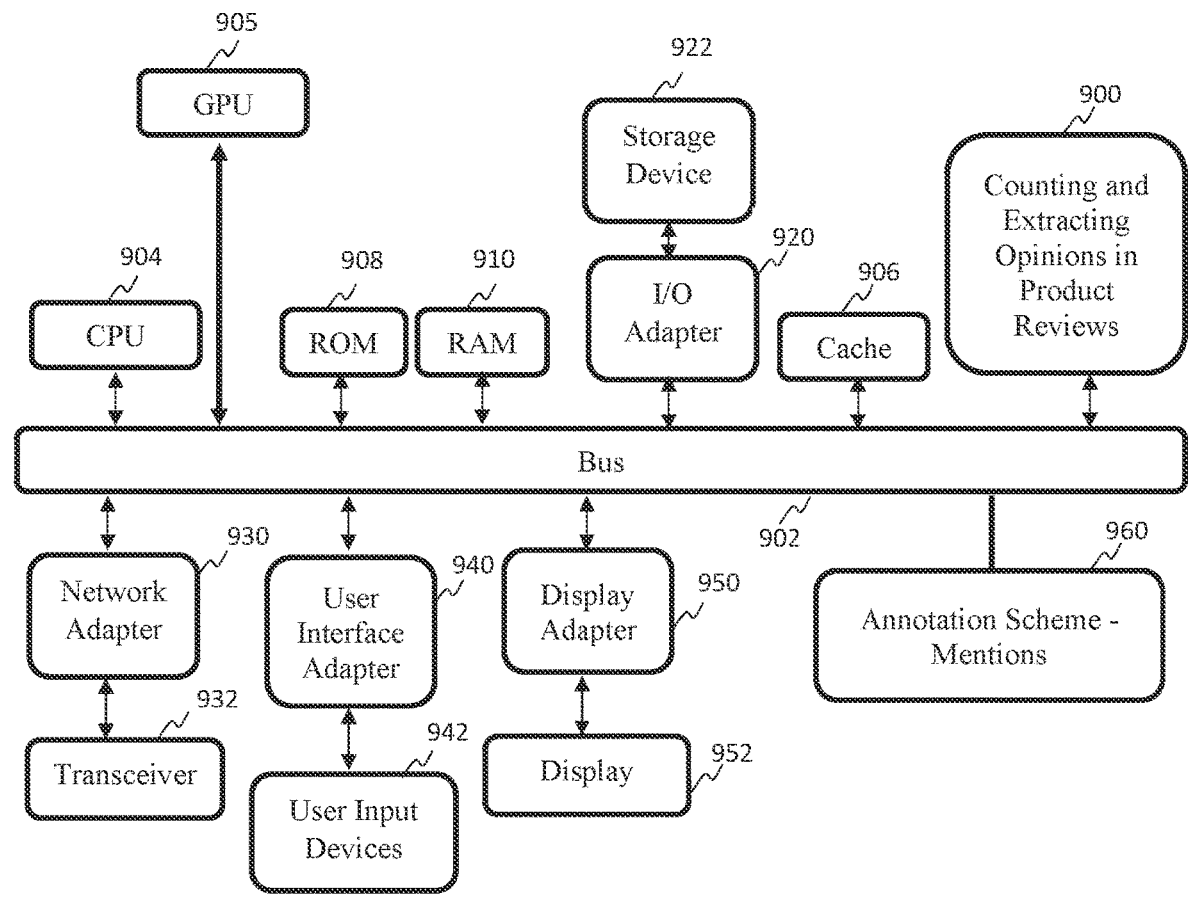
FIG. 5 is a block/flow diagram of an exemplary processing system for counting and extracting opinions in product reviews by decontextualization, in accordance with embodiments of the present invention.

FIG. 5 is an exemplary processing system for counting and extracting opinions in product reviews by decontextualization, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, element 900 counts and extracts opinions in product reviews following FIG. 1, by implementing a decontextualization module (FIG. 2) based on a mention type classifier (FIG. 3) following the annotation scheme 960 described above.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for counting and extracting opinions in product reviews, the method comprising:
   inputting a hypothesis opinion, a product name, and product reviews relating to a product;
   identifying and classifying noun phrases in product reviews by using a mention type classifier, wherein the noun phrases referring to the product being reviewed are recognized using a feedforward neural network using span features from a trained transformer encoder;
   applying a decontextualization component to the product reviews by using the product name;
   applying the decontextualization component to the hypothesis opinion by using the product name;
   excluding noun phrases referring to competing products;
   applying an entailment model to classify each sentence of the decontextualized product reviews against the decontextualized hypothesis opinion as entailing the hypothesis to minimize coreference and bridging errors, the entailment model extracts sentences from product reviews that the mention type classifier predicts as entailing the hypothesis opinion and counts a corresponding number of the product reviews; and
   outputting one or more sentences classified as entailing the hypothesis opinion and a count of corresponding reviews.

2. The computer-implemented method of claim 1, wherein product review sentences with noun phrases referring to a competing product or part/attribute of a competing product are excluded.

3. The computer-implemented method of claim 1, wherein product review sentences with noun phrases referring to the product being reviewed have those phrases replaced with a string indicated as "the main product".

4. The computer-implemented method of claim 1, wherein product review sentences with noun phrases referring to part/attribute being reviewed have a phrase indicated as "of the main product" inserted after those sentences.

5. The computer-implemented method of claim 1, wherein a sentence "I bought [product name]" is inserted before the span features are computed.

6. The computer-implemented method of claim 1, wherein a feedforward neural network is trained to recognize noun phrase classes including at least the "main product," "part/attribute of the main product," a "competing product," "part/attribute of a competing product," and "others".

7. A computer program product for counting and extracting opinions in product reviews, the computer program product comprising a non-transitory computer readable storage medium having program instructions embodied therewith, the program instructions executable by a computer to cause the computer to perform a method comprising:
   input a hypothesis opinion, a product name, and product reviews relating to a product;
   identify and classify noun phrases in the product reviews by using a mention type classifier, wherein the noun phrases referring to the product being reviewed are recognized using a feedforward neural network using span features from a trained transformer encoder;
   apply a decontextualization component to the product reviews by using the product name;
   apply the decontextualization component to the hypothesis opinion by using the product name;
   exclude noun phrases referring to competing products;
   apply an entailment model to classify each sentence of the decontextualized product reviews against the decontextualized hypothesis opinion as entailing the hypothesis to minimize coreference and bridging errors, the entailment model extracts sentences from product reviews that the mention type classifier predicts as entailing the hypothesis opinion and counts a corresponding number of the product reviews; and
   output one or more sentences classified as entailing the hypothesis opinion and a count of corresponding reviews.

8. The computer program product of claim 7, wherein product review sentences with noun phrases referring to a competing product or part/attribute of a competing product are excluded.

9. The computer program product of claim 7, wherein product review sentences with noun phrases referring to the product being reviewed have those phrases replaced with a string indicated as "the main product".

10. The computer program product of claim 7, wherein product review sentences with noun phrases referring to part/attribute being reviewed have a phrase indicated as "of the main product" inserted after those sentences.

11. The computer program product of claim 7, wherein a sentence "I bought [product name]" is inserted before the span features are computed.

12. The computer program product of claim 7, wherein a feedforward neural network is trained to recognize noun phrase classes including at least the "main product," "part/attribute of the main product," a "competing product," "part/attribute of a competing product," and "others".

13. A computer processing system for counting and extracting opinions in product reviews, comprising:
   a memory device for storing program code; and
   a processor device, operatively coupled to the memory device, for running the program code to:
      input a hypothesis opinion, a product name, and product reviews relating to a product;
      identify and classify noun phrases in the product reviews by using a mention type classifier, wherein the noun phrases referring to the product being reviewed are recognized using a feedforward neural network using span features from a trained transformer encoder;
      apply a decontextualization component to the product reviews by using the product name;
      apply the decontextualization component to the hypothesis opinion by using the product name;
      exclude noun phrases referring to competing products;
      apply an entailment model to classify each sentence of the decontextualized product reviews against the decontextualized hypothesis opinion as entailing the hypothesis to minimize coreference and bridging errors, the entailment model extracts sentences from product reviews that the mention type classifier predicts as entailing the hypothesis opinion and counts a corresponding number of the product reviews; and
      output one or more sentences classified as entailing the hypothesis opinion and a count of corresponding reviews.

14. The computer processing system of claim 13, wherein product review sentences with noun phrases referring to a competing product or part/attribute of a competing product are excluded.

15. The computer processing system of claim 13, wherein product review sentences with noun phrases referring to the product being reviewed have those phrases replaced with a string indicated as "the main product".

16. The computer processing system of claim 13, wherein product review sentences with noun phrases referring to part/attribute being reviewed have a phrase indicated as "of the main product" inserted after those sentences.

17. The computer processing system of claim 13, wherein a sentence "I bought [product name]" is inserted before the span features are computed.

* * * * *